(12) United States Patent
Naito (10) Patent No.: US 11,911,753 B2
(45) Date of Patent: Feb. 27, 2024

(54) METHOD FOR PRODUCING HONEYCOMB STRUCTURE, METHOD FOR PRODUCING ELECTRICALLY HEATING SUPPORT AND FILLING MATERIAL INTRUDING DEVICE

(71) Applicant: NGK INSULATORS, LTD., Nagoya (JP)

(72) Inventor: Yuto Naito, Hashima-Gun (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 17/645,778

(22) Filed: Dec. 23, 2021

(65) Prior Publication Data

US 2022/0297106 A1 Sep. 22, 2022

(30) Foreign Application Priority Data

Mar. 16, 2021 (JP) .................................. 2021-042751
Sep. 27, 2021 (JP) .................................. 2021-157058

(51) Int. Cl.
*B01J 35/00* (2006.01)
*B01J 35/04* (2006.01)
(Continued)

(52) U.S. Cl.
CPC ....... *B01J 37/0201* (2013.01); *B01J 35/0033* (2013.01); *B01J 35/04* (2013.01); *B01J 37/08* (2013.01)

(58) Field of Classification Search
CPC .... B01J 37/0201; B01J 35/0033; B01J 37/08; C04B 2235/3409; C04B 2235/428; C04B 2235/658; C04B 2235/663; C04B 2235/9607; C04B 35/565; C04B 35/573; C04B 35/62625; C04B 35/62655;
(Continued)

(56) References Cited

U.S. PATENT DOCUMENTS 6,141,956 A * 11/2000 Iijima .................. F22B 1/1815
60/39.5
2007/0037703 A1* 2/2007 Muroi .................. B28B 11/006
502/439
(Continued)

FOREIGN PATENT DOCUMENTS

JP 2014-198296 A 10/2014
JP 2015-174011 A 10/2015

*Primary Examiner* — Lee A Holly
(74) *Attorney, Agent, or Firm* — BURR PATENT LAW, PLLC (57) ABSTRACT

A method for producing a ceramic honeycomb structure including at least one slit filled with a filling material in a cross section in an axial direction of the honeycomb structure, wherein the honeycomb structure includes: an outer peripheral wall; and a partition wall, the partition wall defining a plurality of cells, wherein the method includes the steps of: preparing a honeycomb structure element comprising at least one slit; masking one end face of the honeycomb structure element except for the slit; and providing the honeycomb structure comprising the at least one slit filled with the filling material by applying a pressure to an axial direction of the honeycomb structure element and feeding the filling material from the one end face to intrude the filling material from the slit on the one end face side to the slit on the other end face side.

9 Claims, 5 Drawing Sheets

(51) Int. Cl.
*B01J 37/02* (2006.01)
*B01J 37/08* (2006.01)

(58) Field of Classification Search
CPC ... C04B 35/632; C04B 35/6365; C04B 35/64; C04B 41/5059; C04B 41/87; C04B 2111/00793; C04B 2111/0081; C04B 38/0006; F01N 3/2828
See application file for complete search history.

(56) References Cited

U.S. PATENT DOCUMENTS

| | | | |
|---|---|---|---|
| 2009/0011180 A1* | 1/2009 | Ichikawa | B01D 46/0001 428/117 |
| 2009/0246452 A1* | 10/2009 | Ogura | B28B 19/00 428/116 |
| 2011/0240205 A1* | 10/2011 | Kamei | B01J 35/04 156/89.11 |
| 2014/0291315 A1 | 10/2014 | Mase et al. | |
| 2015/0260066 A1 | 9/2015 | Hosoi et al. | |
| 2019/0301333 A1* | 10/2019 | Okamoto | F01N 3/2026 |
| 2021/0299909 A1* | 9/2021 | Beebe | B29C 70/745 |
| 2021/0316242 A1* | 10/2021 | Locker | B28B 11/007 |

* cited by examiner

METHOD FOR PRODUCING HONEYCOMB STRUCTURE, METHOD FOR PRODUCING ELECTRICALLY HEATING SUPPORT AND FILLING MATERIAL INTRUDING DEVICE

FIELD OF THE INVENTION

The present invention relates to a method for producing a honeycomb structure, a method for producing an electrically heating support, and a filling material intruding device.

BACKGROUND OF THE INVENTION

Recently, electrically heated catalysts (EHCs) have been proposed to improve a decrease in exhaust gas purification performance immediately after engine starting. For example, the EHC is configured to connect metal electrodes to a pillar shaped honeycomb structure made of conductive ceramics, and conducting a current to heat the honeycomb structure itself, thereby enabling a temperature to be increased to an activation temperature of the catalyst prior to the engine starting.

The EHC preferably has a structure including good thermal shock resistance that is resistant to cracking in response to changes in exhaust gas temperatures in order not to interrupt a current flow path of the honeycomb structure and to prevent the honeycomb structure from falling out.

Patent Literature 1 discloses a technique for improving thermal shock resistance by providing slits on an outer peripheral wall and electrode portions of a honeycomb structure.

Patent Literature 2 discloses a technique for improving thermal shock resistance by forming a slit that opens on a side surface of a honeycomb structure and filling the slit with a filling material.

CITATION LIST

Patent Literatures

[Patent Literature 1] Japanese Patent Application Publication No. 2014-198296 A
[Patent Literature 2] Japanese Patent Application Publication No. 2015-174011 A

SUMMARY OF THE INVENTION

As described in Patent Literature 2, a conventional method for filling the slit formed in the honeycomb structure with the filling material has been manually done by an operator, regardless of whether the filling material is injected by a syringe or filled by a spatula. However, with such a filling method, it may be difficult to fill the slit with the filling material to the inside of the honeycomb structure when a depth of the slit is deeper or viscosity of the filling material is higher. In particular, with these methods, it may be difficult to fill the slit with the filling material to a desired depth, and there is room for improvement.

The present invention has been made in light of the above circumstances. An object of the present invention is to provide a method for producing a honeycomb structure, a method for producing an electrically heating support, and a filling material intruding device, which can fill the slit of the honeycomb structure with the filling material to a desired depth.

The above problem is solved by the following present invention, and the present invention is specified as follows:

(1) A method for producing a ceramic honeycomb structure comprising at least one slit filled with a filling material in a cross section in an axial direction of the honeycomb structure,
wherein the honeycomb structure comprises: an outer peripheral wall; and a partition wall disposed on an inner side of the outer peripheral wall, the partition wall defining a plurality of cells, each of the plurality of cells extending from one end face to the other end face to form a flow path,
wherein the method comprises the steps of:
preparing a honeycomb structure element comprising at least one slit;
masking one end face of the honeycomb structure element except for the slit; and
providing the honeycomb structure comprising the at least one slit filled with the filling material by applying a pressure to an axial direction of the honeycomb structure element and feeding the filling material from the one end face to intrude the filling material from the slit on the one end face side to the slit on the other end face side.

(2) The method for producing the honeycomb structure according to (1), further comprising a step of forming a pair of electrode portions on an outer surface of the outer peripheral wall so as to extend in a band shape in an extending direction of the cells across the central axis of the honeycomb structure.

(3) A method for producing an electrically heating support, the method comprising a step of electrically connecting a metal electrode to each of the pair of electrode portions of the honeycomb structure produced by the method according to (2).

(4) A filling material intruding device for filling at least one slit with a filling material, the at least one slit being provided in a cross section in an axial direction of a honeycomb structure, the honeycomb structure comprising an outer peripheral wall and a partition wall,
wherein the filling material intruding device comprises:
a support portion fixed to the filling material intruding device;
a holding portion holding a honeycomb structure element that has at least one slit to be processed and has masked one end face except for the slit from a side surface side, and abuts on a side surface of the support portion; and
a pressing portion for applying a pressure to the honeycomb structure element to be processed;
wherein an upper surface of the support portion, the side surface of the holding portion, and one end face of the honeycomb structure element to be processed define a filling material feeding chamber; and
wherein the filling material intruding device is configured to apply the pressure by the pressing portion to one or the other end face of the honeycomb structure element to be processed, thereby moving the honeycomb structure element and the holding portion relative to the support portion, and reducing a volume of the filling material feeding chamber, so that the filling material fed to the filling material feed chamber is intruded into the slit of the honeycomb structure element from the one end face side.

According to the present invention, it is possible to provide a method for producing a honeycomb structure, a method for producing an electrically heating support, and a filling material intruding device, which can fill the slit of the honeycomb structure with the filling material to a desired depth.

DETAILED DESCRIPTION OF THE INVENTION

Hereinafter, embodiments according to the present invention will be specifically described with reference to the drawings. It is to understand that the present invention is not limited to the following embodiments, and various design modifications and improvements may be made based on ordinary knowledge of a person skilled in the art, without departing from the spirit of the present invention.

<1. Honeycomb Structure>

Figure 1:
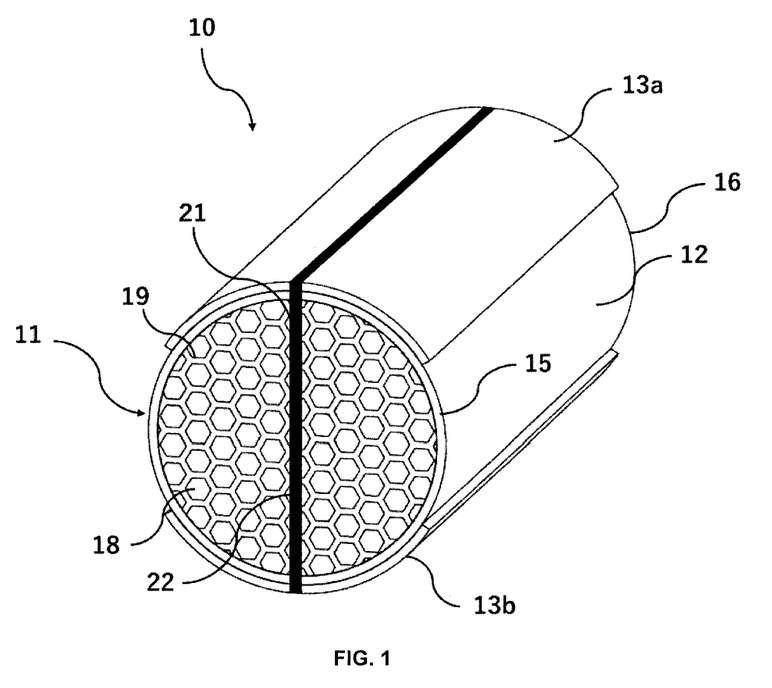
FIG. 1 is a schematic external view of a honeycomb structure according to an embodiment of the present invention.

FIG. 1 is a schematic external view of a honeycomb structure 10 according to an embodiment of the present invention. The honeycomb structure 10 includes a honeycomb structure portion 11 and electrode portions 13a, 13b. The honeycomb structure 10 may not include the electrode portions 13a, 13b.

(1-1. Honeycomb Structure Portion)

The honeycomb structure partition 11 is a pillar shaped member made of ceramics, and includes: an outer peripheral wall 12; and partition walls 19 which are disposed on an inner side of the outer peripheral wall 12 and define a plurality of cells 18 each extending from one end face 15 to the other end face 16 to form a flow path. The word "pillar shaped" is understandable as a three-dimensional shape having a thickness in an extending direction of the cells (an axial direction of the honeycomb structure). A ratio of the axial length of the honeycomb structure to the diameter or width of each end face of the honeycomb structure (an aspect ratio) is arbitrary. The pillar shape may also include a shape in which the axial length of the honeycomb structure is shorter than the diameter or width of each end face (flat shape).

An outer shape of the honeycomb structure portion 11 is not particularly limited as long as it is pillar shaped. For example, the honeycomb structure portion can have a shape such as a pillar shape with circular end faces (cylindrical shape), a pillar shape with oval end faces and a pillar shape with polygonal (quadrangular, pentagonal, hexagonal, heptagonal, octagonal, etc.) end faces. The size of the honeycomb structure portion 11 is such that an area of the end faces is preferably from 2000 to 20000 $mm^2$, and more preferably from 5000 to 15000 $mm^2$, for the purpose of improving heat resistance (suppressing cracks entering the outer peripheral wall in a circumferential direction).

The honeycomb structure portion 11 is made of a material selected from the group consisting of oxide ceramics such as alumina, mullite, zirconia and cordierite, and non-oxide ceramics such as silicon carbide, silicon nitride and aluminum nitride, although not limited thereto. Silicon carbide-metal silicon composite materials and silicon carbide/graphite composite materials may also be used. Among them, the material of the honeycomb structure portion 11 preferably contains ceramics mainly based on the silicon-silicon carbide composite material or on silicon carbide, in terms of achieving both heat resistant and electrical conductivity. The phrase "the honeycomb structure portion 11 is mainly based on a silicone-silicon carbide composite material" as used herein means that the honeycomb structure portion 11 contains 90% by mass or more of the silicon-silicon carbide composite material (total mass) based on the entire honeycomb structure portion. Here, the silicon-silicon carbide composite material contains silicon carbide particles as an aggregate and silicon as a bonding material for bonding the silicon carbide particles, and a plurality of silicon carbide particles are preferably bonded by silicon so as to form pores between the silicon carbide particles. The phrase "the honeycomb structure portion 11 is mainly based on silicon carbide" as used herein means that the honeycomb structure portion 11 contains 90% by mass or more of the silicon carbide (total mass) based on the entire honeycomb structure portion.

When the honeycomb structure portion 11 contains the silicon-silicon carbide composite material, a ratio of a "mass of silicon as a bonding material" contained in the honeycomb structure portion 11 to the total of a "mass of silicon carbide particles as an aggregate" contained in the honeycomb structure portion 11 and a "mass of silicon as a bonding material" contained in the honeycomb structure portion 11 is preferably from 10 to 40% by mass, and more preferably from 15 to 35% by mass.

A shape of each cell in a cross section perpendicular to an extending direction of the cells 18 is not limited, but it is preferably a quadrangle, a hexagon, an octagon, or a combination thereof. Among these, the quadrangle and the hexagon are preferred, in terms of easily achieving both structural strength and heating uniformity.

Each of the partition walls 19 defining the cells 18 preferably has a thickness of from 0.1 to 0.3 mm, and more preferably from 0.15 to 0.25 mm. As used herein. the thickness of the partition wall 19 is defined as a length of a portion passing through the partition walls 19, among line segments connecting centers of gravity of the adjacent cells 18 in the cross section perpendicular to the extending direction of the cells 18.

The honeycomb structure portion 11 preferably has a cell density of from 40 to 150 cells/$cm^2$, and more preferably from 70 to 100 cells/$cm^2$, in the cross section perpendicular to the flow path direction of the cells 18. The cell density in such a range can increase the purification performance of the catalyst while reducing the pressure loss upon flowing of an exhaust gas. The cell density is a value obtained by dividing the number of cells by an area of one end face of the honeycomb structure portion 11 excluding the outer peripheral wall 12 portion.

The provision of the outer peripheral wall 12 of the honeycomb structure portion 11 is useful in terms of ensuring the structural strength of the honeycomb structure portion 11 and preventing a fluid flowing through the cells 18 from leaking from the outer peripheral wall 12. More particularly, the thickness of the outer peripheral wall 12 is preferably 0.05 mm or more, and more preferably 0.1 mm or more, and even more preferably 0.15 mm or more. However, if the outer peripheral wall 12 is too thick, the strength becomes too high, so that a strength balance between the outer peripheral wall 12 and the partition wall 19 is lost to reduce thermal shock resistance, and if the thickness of the outer peripheral wall 12 is excessively increased, the heat capacity increases and a temperature difference between the outer peripheral side and the inner peripheral side of the outer peripheral wall 12 increases, so that the heat impact resistance decreases. Therefore, the thickness of the outer peripheral wall 12 is preferably 1.0 mm or less, and more preferably 0.7 mm or less, and still more preferably 0.5 mm or less. As used herein, the thickness of the outer peripheral wall 12 is defined as a thickness of the outer peripheral wall 12 in a direction of a normal line to a tangential line at a measurement point when observing a portion of the outer peripheral wall 12 to be subjected to thickness measurement in the cross section perpendicular to the extending direction of the cells 18.

The partition walls 19 of the honeycomb structure portion 11 preferably have an average pore diameter of from 2 to 15 µm, and more preferably from 4 to 8 µm. The average pore diameter is a value measured by a mercury porosimeter.

The partition walls 19 may be porous. When the partition walls 19 are porous, the partition wall 19 preferably has a porosity of from 35 to 60%, and more preferably from 35 to 45%. The porosity is a value measured by a mercury porosimeter.

The honeycomb structure 10 is made of ceramics, and preferably has electrical conductivity. Volume resistivity of the honeycomb structure 10 is not particularly limited as long as the honeycomb structure 10 can generate heat by Joule heat upon electrical conduction. The volume resistivity is preferably from 0.1 to 200 Ωcm, and more preferably from 1 to 200 Ωcm. As used herein, the volume resistivity of the honeycomb structure 10 is a value measured at 400° C. by a four-terminal method.

(1-2. Electrode Portion)

The honeycomb structure 10 includes a pair of electrode portions 13a, 13b on an outer surface of the outer peripheral wall 12 across a central axis of the honeycomb structure portion 11 so as to extend in the form of a band in the extending direction of the cells 18. By thus providing the pair of electrode portion 13a, 13b, uniform heat generation of the honeycomb structure 10 can be enhanced. It is desirable that each of the electrode portions 13a, 13b extends over a length of 80% or more, and preferably 90% or more, and more preferably the full length, between both end faces of the honeycomb structure 10, from the viewpoint that a current easily spreads in an axial direction of each of the electrode portions 13a, 13b.

Each of the electrode portions 13a, 13b preferably has a thickness of from 0.01 to 5 mm, and more preferably from 0.01 to 3 mm. Such a range can allow uniform heat generation to be enhanced. The thickness of each of the electrode portions 13a, 13b is defined as a thickness in a direction of a normal line to a tangential line at a measurement point on an outer surface of each of the electrode portions 13a, 13b when observing the point of each electrode portion to be subjected to thickness measurement in the cross section perpendicular to the extending direction of the cells.

The electrical resistivity of each of the electrode portions 13a, 13b is lower than the electrical resistivity of the honeycomb structure portion 11, whereby the electricity tends to flow preferentially to the electrode portions 13a, 13b, and the electricity tends to spread in the flow path direction and the circumferential direction of the cells 18 during electric conduction. The electrical resistivity of the electrode portions 13a, 13b is preferably ¹⁄₂₀₀ or more and ¹⁄₁₀ or less of the electrical resistivity of the honeycomb structure portion 11. As used herein, the electrical resistivity of the electrode portions 13a, 13b is a value measured at 25° C. by a four-terminal method.

Each of the electrode portions 13a, 13b may be made of conductive ceramics, a metal, and a composite of a metal and conductive ceramics (cermet). Examples of the metal include a single metal of Cr, Fe, Co, Ni, Si or Ti, or an alloy containing at least one metal selected from the group consisting of those metals. Non-limiting examples of the conductive ceramics include silicon carbide (SiC), metal compounds such as metal silicides such as tantalum silicide ($TaSi_2$) and chromium silicide ($CrSi_2$). Specific examples of the composite of the metal and the conductive ceramics (cermet) include a composite of metal silicon and silicon carbide, a composite of metal silicide such as tantalum silicide and chromium silicide, metal silicon and silicon carbide, and further a composite obtained by adding to one or more metals listed above one or more insulating ceramics such as alumina, mullite, zirconia, cordierite, silicon nitride, and aluminum nitride, in terms of decreased thermal expansion.

(1-3. Slit)

In the cross section in the axial direction of the honeycomb structure 10, at least one slit 21 is provided. The slit 21 is formed so as to penetrate from one end face to the other end face of the honeycomb structure 10. According to this configuration, when the honeycomb structure 10 generates heat, stress relaxation will function by the slit 21, so that generation of cracks due to a thermal expansion difference generated within the honeycomb structure 10 can be well suppressed.

The shape and number of slits 21 on the end face of the honeycomb structure 10 are not particularly limited and can be designed accordingly. For example, there may be one slit 21 or two or more slits 21 on the end face of the honeycomb structure 10, each of which may be formed so that they do not intersect with each other, or may be formed so that they at least partially intersect with each other. The length and width of each slit 21 on the end face of the honeycomb structure 10 are not particularly limited. The width of each slit 21 on the end face of the honeycomb structure 10 may be formed to be the same as the width of each cell 18, or the width of each slit 21 may be formed to be larger than that of each cell 18. The width of each slit 21 on the end face of the honeycomb structure 10 is not particularly limited, but it may be 1 to 5 cells. Further, the length of each slit is not particularly limited, but it may be from 2 to 80 cells. The length and width of each slit 21 on the end face of the honeycomb structure 10 can be designed appropriately depending on the size, material, applications, and number of slits 21 of the honeycomb structure 10.

Each slit 21 may be divided into sections along an extending direction of the slits 21 on the end face of the honeycomb structure 10. In this case, the slit 21 may be divided into slits having the same length or different lengths on the end face of the honeycomb structure 10. By dividing and forming the slit 21 on the end face of the honeycomb structure 10, the generation of cracks in the honeycomb structure 10 can be well controlled. The number of slits 21 divided is not particularly limited, but each slit 21 may be divided into two, three, or four or more sections. In addition, the honeycomb structure may be provided with a plurality of slits consisting of the combination of divided slits and non-divided slits.

FIG. 1 schematically shows an embodiment where there is one slit 21 on the end face of the honeycomb structure 10. The slit 21 may extend so as to pass through the center as shown in FIG. 1 or so as not to pass through the center on the end face of the honeycomb structure 10. Specific examples of an embodiment where a plurality of slits 21 are formed are shown in FIG. 2(A) to FIG. 2(H). It should be noted that each of FIG. 2(A) to FIG. 2(H) only schematically shows the outer diameter of one end face 15 of the honeycomb structure 10 and the shape of the slits 21. All of them show the morphology at one end face of the honeycomb structure 10. These slits 21 maintain a similar morphology in the cross section of the honeycomb structure 10 and are formed to extend in the axial direction and penetrate to the other end face 16 of the honeycomb structure 10.

Figures 2A, 2B:
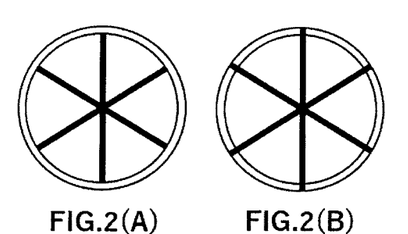
FIG. 2(A) to FIG. 2(H) are schematic views showing specific examples of shapes of slits at end faces of honeycomb structures.

As shown in FIG. 2(A), the slits 21 may be three slits that intersect with one another at the center and extend to the inner peripheral end of the outer peripheral wall on both sides, on the end face of the honeycomb structure 10. As shown in FIG. 2(B), each of the three slits shown in FIG. 2(A) may be formed to a length that reaches the outer peripheral wall.

Figures 2C, 2D:
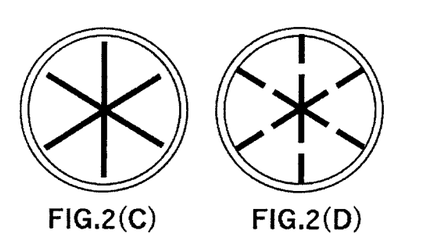

As shown in FIG. 2(C), the slits 21 may be formed at a length where the three slits shown in FIG. 2(A) do not each reach the inner end of the outer peripheral wall on the end face of the honeycomb structure 10. Also, as shown in FIG. 2(D), each of the three slits shown in FIG. 2(A) may be divided along the extending direction.

Figure 2E:
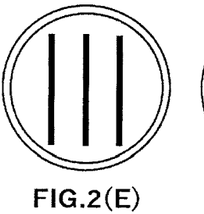
Figure 2F:
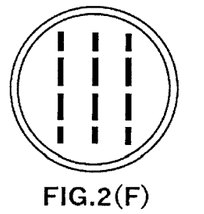

As shown in FIG. 2(E), the slits 21 may be three slits extending parallel to one another on the end face of the honeycomb structure 10. As shown in FIG. 2(F), each of the three slits shown in FIG. 2(E) may be divided along the extending direction.

Figure 2G:
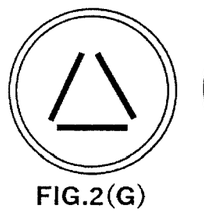
Figure 2H:
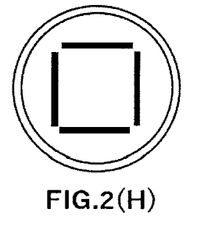

As shown in FIG. 2(G), the slits 21 may be three slits, which form a substantially triangle where the slits do not intersect at their apexes, on the end face of the honeycomb structure 10. As shown in FIG. 2(H), the slits may also be four slits, which form a substantially square where the slits do not intersect at their apexes.

(1-4. Filling Material)

The at least one slit 21 is filled with a filling material. When a plurality of slits 21 are provided, the filling material 22 may be provided in some of the slits 21, or the filling material may be provided in all the slits 21. From the viewpoint of heat impact resistance of the honeycomb structure 10, it is more preferable to provide the filling material 22 in all the slits 21.

The filling material 22 may be filled from one end face 15 to the other end face 16 of the honeycomb structure 10, or may be filled from one end face 15 of the honeycomb structure 10 to a desired depth. In the honeycomb structure 10, the depth of the filling material 22 from one end face 15 is preferably 1% or more relative to the length between both end faces of the honeycomb structure 10. According to such a configuration, generation of cracks can be well suppressed in the flow path direction of the cells 18 of the honeycomb structure 10. In the honeycomb structure 10, the depth of the filling material 22 from one end face 15 is more preferably 50% or more with respect to the length between both end faces of the honeycomb structure 10. Further, from the viewpoint of heat impact resistance of the honeycomb structure 10, it is most preferable that the slit is filled with the filling material 22 from one end face 15 to the other end face 16 of the honeycomb structure 10.

When the honeycomb structure portion 11 is mainly based on silicon carbide or a silicon carbide-metal silicon composite material, the filling material 22 preferably contains 20% by mass or more of silicon carbide, and even more preferably from 20 to 70% by mass of silicon carbide. This can allow a thermal expansion coefficient of the filling material 22 to be close to that of the honeycomb structure portion 11, thereby improving the thermal shock resistance of the honeycomb structure 10. The filling material 22 may contain 30% by mass or more of silica, alumina, or the like.

The filling material 22 preferably has a viscosity of from 1 to 100 Pa·s when filling a honeycomb structure element as described later. The viscosity of the filling material of 1 Pa·s or more can lead to improved mechanical strength of the honeycomb structure 10. The viscosity of the filling material of 100 Pa·s or less can lead to improved heat impact resistance of the honeycomb structure 10. The viscosity of the filling material 22 is more preferably from 20 to 80 Pa·s, and even more preferably from 40 to 60 Pa·s. The viscosity of the filling material can be adjusted by changing an amount of water added, an amount of a binder added, and the like.

<2. Electrically Heating Support>

Figure 3:
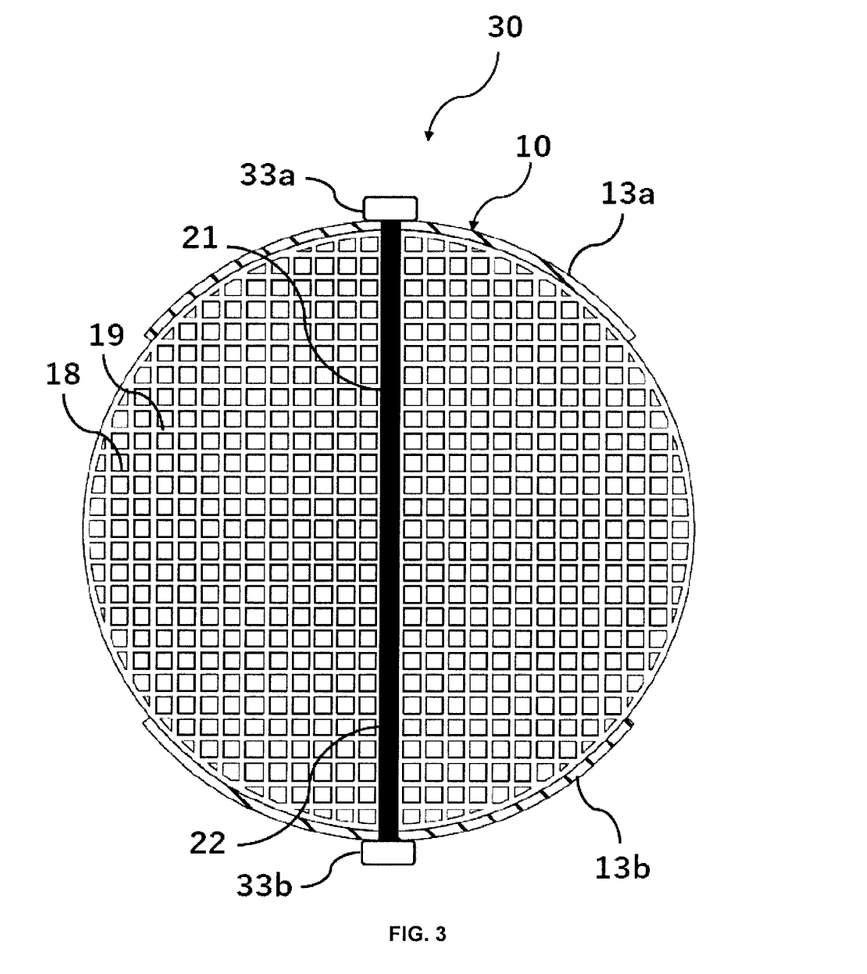
FIG. 3 is a schematic cross-sectional view of an electrically heating support according to an embodiment of the present invention, which is perpendicular to an extending of cells.

FIG. 3 is a schematic cross-sectional view of an electrically heating support 30 according to an embodiment of the present invention, which is perpendicular to the extending direction of the cells. The electrically heating support 30 includes: the honeycomb structure 10; and metal electrodes 33a, 33b electrically connected to the electrode portions 13a, 13b of the honeycomb structure 10, respectively.

(2-1. Metal Electrode)

Metal electrodes 33a, 33b are provided on the electrode portions 13a, 13b of the honeycomb structure 10. The metal electrode 33a, 33b may be a pair of metal electrode such that one metal electrode 33a is disposed so as to face the other metal electrode 33b across the central axis of the honeycomb structure portion 11. As a voltage is applied to the metal electrodes 33a, 33b through the electrode portions 13a, 13b, then the electricity is conducted through the metal electrodes 33a, 33b to allow the honeycomb structure portion 11 to generate heat by Joule heat. Therefore, the electrically heating support 30 can also be suitably used as a heater. The applied voltage is preferably from 12 to 900 V, and more preferably from 48 to 600 V, although the applied voltage may be changed as needed.

The material of the metal electrodes 33a, 33b is not particularly limited as long as it is a metal, and a single metal, an alloy, or the like can be employed. In terms of corrosion resistance, electrical resistivity and linear expansion coefficient, for example, the material is preferably an alloy containing at least one selected from the group consisting of Cr, Fe, Co, Ni and Ti, and more preferably stainless steel and Fe—Ni alloys. The shape and size of each of the metal electrodes 33a, 33b are not particularly limited, and they can be appropriately designed according to the size of the electrically heating support 30, the electrical conduction performance, and the like.

By supporting the catalyst on the electrically heating support 30, the electrically heating support 30 can be used as a catalyst. For example, a fluid such as an exhaust gas from a motor vehicle can flow through the flow paths of the plurality of cells 18 of the honeycomb structure 10. Examples of the catalyst include noble metal catalysts or catalysts other than them. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a NOx storage reduction catalyst (LNT catalyst) containing an alkaline earth metal and platinum as storage components for nitrogen oxides ($NO_x$). Illustrative examples of a catalyst that does not use the noble metal include a NOx selective reduction catalyst (SCR catalyst) containing a copper-substituted or iron-substituted zeolite, and the like. Further, two or more catalysts selected from the group consisting of those catalysts may be used. A method for supporting the catalyst is not particularly limited, and it can be carried out according to a conventional method for supporting the catalyst on the honeycomb structure.

<3. Filling Material Intruding Device>

Figure 4:
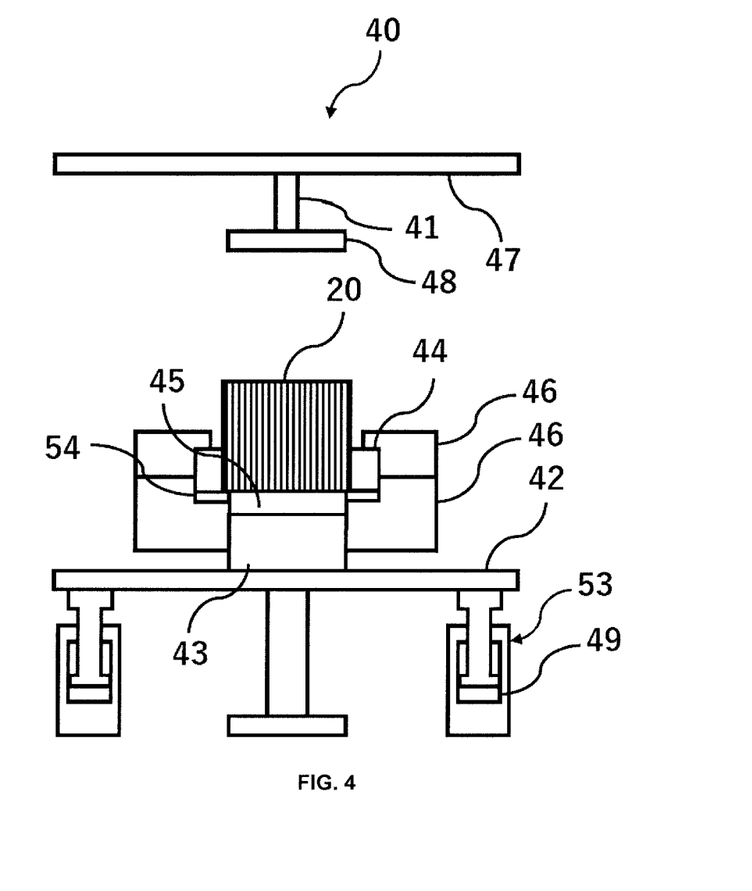
FIG. 4 is a schematic cross-sectional view of a filling material intruding device according to an embodiment of the present invention.

FIG. 4 shows a schematic cross-sectional view of a filling material intruding device 40 used in the method for producing the honeycomb structure according to an embodiment of the present invention. The filling material intruding device 40 includes: a support portion 43 fixed to a support table 42; a holding portion 46 holds the honeycomb structure element 20 which is provided with at least one slit to be processed, that has masked one end face except for the slit from the side surface side, and abuts on a side surface of the support portion 43; and a pressing portion 48 for applying a pressure to the honeycomb structure element 20 to be processed. A space separated by an upper surface of the support portion 43, a side surface of the holding portion 46, and one end face of the honeycomb structure element 20 to be processed defines a filling material feeding chamber 45 to which the filling material is fed. As used herein, the honeycomb structure element 20 provided with the slit prepared by the filling material intruding device 40 means the honeycomb structure before the filling material is filled, which is a honeycomb fired body or honeycomb dried body provided with the slit, as described later.

The holding portion 46 is provided so as to cover outer peripheries of the honeycomb structure element 20 to be processed and the support portion 43, and may directly hold the side surface of the honeycomb structure element 20. However, as shown in FIG. 4, a preferable structure is that an elastic member 44 for filling a gap is further provided between the holding portion 46 and the side surface of the honeycomb structure element 20 to be processed. According to such a structure, the honeycomb structure element 20 can be held by the elastic member 44, thereby suppressing damage to the side surface of the honeycomb structure. Further, it is possible to prevent a filling material 50 in the filling material feeding chamber 45 from leaking from a portion (gap) other than the slit of the honeycomb structure element 20 when the filling material is intruded. Non-limiting example of the elastic member 44 that can be used herein include an elastic member made of a resin material having elasticity by pneumatic pressure such as a known balloon chuck.

The holding portion 46 preferably has a sealing member 54 directly below the elastic member 44. By having the sealing member 54 directly below the elastic member 44, it is possible to prevent the filling material 50 in the filling material feeding chamber 45 from leaking out when the filling material is intruded. Non-limiting examples of the sealing member 54 that can be used herein include urethane, rubbers, and the like.

Figure 5A:
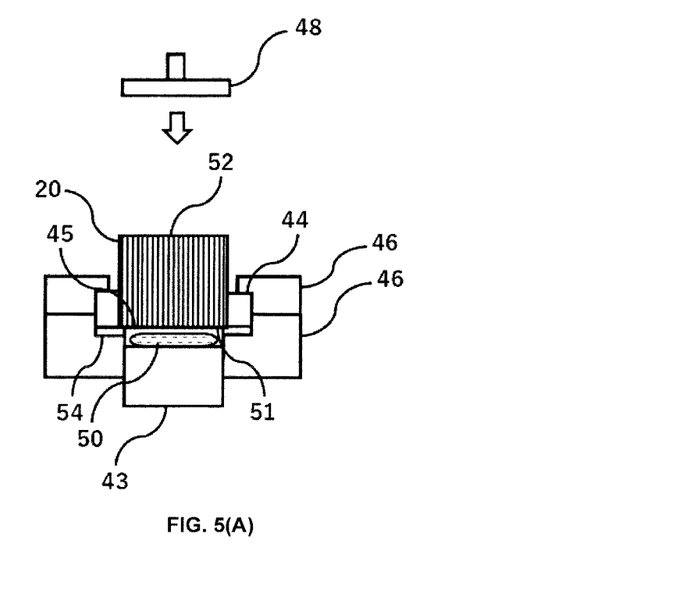
FIGS. 5(A) and 5(B) are schematic views for explaining a method of filling a slit of a honeycomb structure element with a filling material using a filling material intruding device.
Figure 5B:
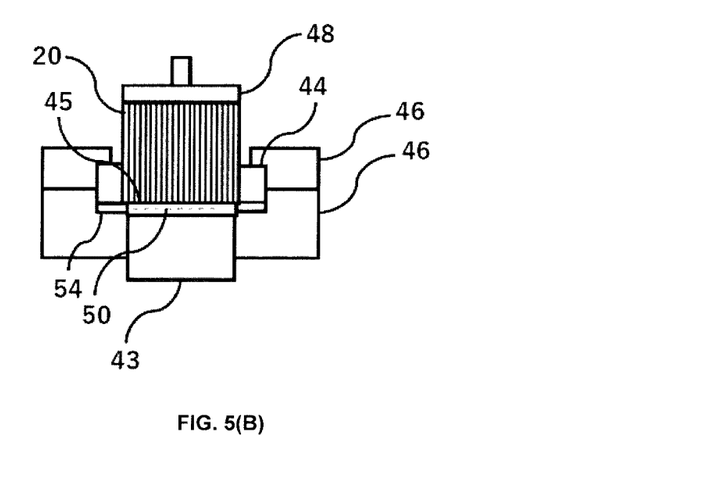

Each of FIG. 5(A) and FIG. 5(B) schematically shows that the filling material 50 is filled in the slit of the honeycomb structure element 20 by using the filling material intruding device 40. First, as shown in FIG. 5(A), the filling material 50 is fed to the space surrounded by the upper surface of the support portion 43 and the holding portion 46 of the filling material intruding device 40, and then, above the filling material 50, the honeycomb structure element 20 is inserted into the holding portion 46 from one end face 51 side. At this time, the filling material feeding chamber 45 is formed by the space separated by the upper surface of the support portion 43, the side surface of the holding portion 46, and one end face 51 of the honeycomb structure element 20 to be processed. Here, as described above, the elastic member 44 is provided on the side surface of the holding portion 46, and the sealing member 54 is further provided directly below the elastic member 44, and these members prevent the filling material 50 from leaking out of the filling material feeding chamber 45 upon the intrusion of the filling material. Further, at this time, the honeycomb structure element 20 is provided so as to interlock with the holding portion 46 by a holding force of the holding portion 46 that abuts on the side surface of the honeycomb structure element 20.

Subsequently, the pressing portion 48 is gradually lowered, and applies a pressure to the honeycomb structure element 20 from its upper surface (the other end face 52). When the pressure is applied by the pressing portion 48, as shown in FIG. 5(B), the honeycomb structure element 20 and the holding portion 46 move relative to the support portion 43, and a volume of the filling material feeding chamber 45 is reduced, so that the filling material 50 fed to the filling material feeding chamber 45 is intruded into the slit of the honeycomb structure element 20 from one end face 51 side. It should be noted that the pressure may be applied to the honeycomb structure element 20 from its lower surface (one end face 51). In this case, after being gradually lowered and abutting on the other end face 52, the pressing portion 48 is configured as a regulating portion that regulates the honeycomb structure element 20, such that the pressure is applied by the support portion 43 to apply the pressure from one end face 51.

The support portion 43 is formed in a pillar shape as in the honeycomb structure element 20, and has an axial cross-sectional shape similar to that of the honeycomb structure element 20. Further, the holding portion 46 is provided so as to surround the peripheries of the honeycomb structure element 20 and the support portion 43 to abut on the side surfaces of the honeycomb structure element 20 and the support portion 43. According to such a configuration, the filling material feeding chamber 45 separated by the upper surface of the support portion 43, the side surface of the holding portion 46 and one end face of the honeycomb structure element 20 to be processed can easily form a closed space, so that by applying the pressure with the pressing portion 48 described later, the filling material 50 in the filling material feeding chamber 45 can satisfactorily be filled in the slit of the honeycomb structure element 20 without leaking to the outside.

A material of the support portion 43 is not limited as long as the support portion 43 is not deformed or damaged by the pressure from the upper surface, has a minimum strength enough to give a reaction force to the pressure from the upper surface, and at least the upper surface does not react with the filling material. For example, the support portion 43 may be formed of, for example, a composite material such as metals and fiber reinforced plastics.

The holding portion 46 abuts on the side surface of the honeycomb structure element 20 and moves up and down together with the honeycomb structure element 20. A material of the holding portion 46 is not particularly limited as long as it has a minimum strength sufficient to hold the honeycomb structure element 20 from the side surface. For example, the holding portion 46 may be formed of a composite material such as metals and fiber reinforced plastics.

It is preferable that the holding portion 46 is directly or indirectly connected to cylinders 49 that will receive a load when the honeycomb structure element 20 is applied from the pressing portion 48. In the example shown in FIG. 4, each cylinder 49 is constructed as a leg portion 53 to support both ends of the support table 42, and each cylinder 49 receives a load when the honeycomb structure element 20 is applied from the pressing portion 48. At this time, a driving force with a pneumatic pressure of each cylinder 49 is indirectly transmitted from the support table 42 to the holding portion 46. As the honeycomb structure element 20 is applied from the pressing portion 48, the holding portion 46 is lowered together with the honeycomb structure element 20 accordingly, and the volume of the filling material feeding chamber 45 is reduced to feed the filling material 50 into the slit. However, since each cylinder 49 is directly or indirectly connected to the holding portion 46, it is possible to provide a function of returning the honeycomb structure element 20 and the holding portion 46 lowered at this time to their original positions.

The pressing portion 48 is a flat plate having the same planar shape as the cross section of the honeycomb structure element 20, and is fixed to an arm 47 located at the uppermost end of the filling material intruding device 40 via a support shaft 41. A material of the pressing portion 48 is not particularly limited as long as it has a minimum strength enough not to cause deformation or breakage when pressure is applied to the honeycomb structure element 20. For example, the pressing portion may be formed of SUS or the like. Further, the pressing portion 48 has a porous elastic member on the abutting surface upon the honeycomb structure element 20, in order to enable a gas pushing out from the slit of the honeycomb structure element 20 to be discharged to the outside when the pressure is applied. Examples of the porous elastic member that can be used herein include a flexible elastic body made by foaming and solidifying a synthetic resin such as a sponge. By having such a porous elastic member on the abutting surface of the pressing portion 48 upon the honeycomb structure element 20, the gas pushing out from the slit is discharged to the outside when the honeycomb structure element 20 is pressed, so that the filling material can be well filled in the slit. Furthermore, the pressing portion 48 may be driven by pneumatic pressure with a cylinder provided on the support shaft 41.

<4. Method for Producing Honeycomb Structure>

Next, a method for producing the honeycomb structure according to an embodiment of the present invention will be described.

The method for producing the honeycomb structure according to an embodiment of the present invention includes: a forming step of producing a honeycomb formed body; a drying step of producing a honeycomb dried body; a firing step of producing a honeycomb fired body; and a filling step of providing a filling material in at least one slit of the honeycomb fired body and firing it.

(Forming Step)

In the forming step, first, a forming raw material containing conductive ceramics is prepared. The forming raw material is prepared by adding metal silicon powder (metal silicon), a binder, a surfactant(s), a pore former, water, and the like to silicon carbide powder (silicon carbide). It is preferable that a mass of metal silicon is from 10 to 40% by mass relative to the total of mass of silicon carbide powder and mass of metal silicon. The average particle diameter of the silicon carbide particles in the silicon carbide powder is preferably from 3 to 50 μm, and more preferably from 3 to 40 μm. The average particle diameter of the metal silicon (the metal silicon powder) is preferably from 2 to 35 μm. The average particle diameter of each of the silicon carbide particles and the metal silicon (metal silicon particles) refers to an arithmetic average diameter on volume basis when frequency distribution of the particle size is measured by the laser diffraction method. The silicon carbide particles are fine particles of silicon carbide forming the silicon carbide powder, and the metal silicon particles are fine particles of metal silicon forming the metal silicon powder. It should be noted that this is the formulation of the molding raw material in the case where the material of the honeycomb structure is the silicon-silicon carbide composite material, and when the material of interest is silicon carbide, no metal silicon is added.

Examples of the binder include methyl cellulose, hydroxypropylmethyl cellulose, hydroxypropoxyl cellulose, hydroxyethyl cellulose, carboxymethyl cellulose, polyvinyl alcohol and the like. Among these, it is preferable to use methyl cellulose in combination with hydroxypropoxyl cellulose. The content of the binder is preferably from 2.0 to 10.0 parts by mass when the total mass of the silicon carbide powder and the metal silicon powder is 100 parts by mass.

The content of water is preferably from 20 to 60 parts by mass when the total mass of the silicon carbide powder and the metal silicon powder is 100 parts by mass.

The surfactant that can be used includes ethylene glycol, dextrin, fatty acid soaps, polyalcohol and the like. These may be used alone or in combination of two or more. The content of the surfactant is preferably from 0.1 to 2.0 parts by mass when the total mass of the silicon carbide powder and the metal silicon powder is 100 parts by mass.

The pore former is not particularly limited as long as the pore former itself forms pores after firing, including, for example, graphite, starch, foamed resins, water absorbing resins, silica gel and the like. The content of the pore former is preferably from 0.5 to 10.0 parts by mass when the total mass of the silicon carbide powder and the metal silicon powder is 100 parts by mass. An average particle diameter of the pore former is preferably from 10 to 30 μm.

The resulting forming raw material is then kneaded to form a green body, and the green body is then extruded to prepare a honeycomb structure. The honeycomb formed body includes: the outer peripheral wall; and the partition walls which are disposed on the inner side of the outer peripheral wall and define the plurality of cells each extending from one end face to the other end face to form the flow path.

(Drying Step)

The resulting honeycomb formed body is then dried to produce a honeycomb dried body. The drying method is not particularly limited. Examples include electromagnetic wave heating methods such as microwave heating/drying and high-frequency dielectric heating/drying, and external heating methods such as hot air drying and superheated steam drying. Among them, it is preferable to dry a certain amount of moisture by the electromagnetic wave heating method and then dry the remaining moisture by the external heating method, in terms of being able to dry the entire molded body quickly and evenly without cracking. As for conditions of drying, it is preferable to remove 30 to 99% by mass of the water content before drying by the electromagnetic wave heating method, and then reduce the water content to 3% by mass or less by the external heating method. The dielectric heating/drying is preferable as the electromagnetic heating method, and hot air drying is preferable as the external heating method. The drying temperature may preferably be from 50 to 120° C.

At least one slit is then formed on the honeycomb dried body. It should be noted that the slit does not have to be formed on the honeycomb dried body, and as described below, after the honeycomb dried body is fired to produce the honeycomb fired body, the slit may be formed on the honeycomb fired body. The shape, number of slits, number of intersections, length, and width of the slit can be designed as needed depending on the desired characteristics of the honeycomb structure to be produced, and the like.

(Firing Step)

The resulting honeycomb dried body is then fired to produce a honeycomb fired body. As the firing conditions, the honeycomb dried body is preferably heated in an inert atmosphere such as nitrogen or argon at 1400 to 1500° C. for 1 to 20 hours. After firing, an oxidation treatment is preferably carried out at 1200 to 1350° C. for 1 to 10 hours in order to improve durability. The methods of degreasing and firing are not particularly limited, and they can be carried out using an electric furnace, a gas furnace, or the like.

(Filling Step)

Next, the filling material is filled in the slit of the honeycomb fired body or dried body (honeycomb structure element) with the formed slit, using the above filling material intruding device. Specifically, first, one end face of the honeycomb structure element provided with the slit, except for the slit, is masked using a masking tape or the like. At this time, when a plurality of slits are provided on one end face of the honeycomb structure element, the filling material may be filled without masking all the slits, or some of the slits are masked and the remaining slit(s) may be filled with the filling material. Further, when at least one slit is provided on the outer peripheral wall of the honeycomb structure element and the slit on the outer peripheral wall is filled with the filling material, further masking is preferably provided around the outer peripheral circumference of the honeycomb structure element.

The filling material is then fed to the space surrounded by the upper surface of the support portion and the holding portion of the filling material intruding device. Subsequently, the masked honeycomb structure element is inserted into the holding portion from the masked end face side, above the filling material. At this time, the filling material feeding chamber is formed by the space separated by the upper surface of the support portion, the side surface of the holding portion, and one end face of the honeycomb structure element. The honeycomb structure element is provided so as to interlock with the holding portion by the holding force of the holding portion that abuts on the side surface of the honeycomb structure element.

Subsequently, the pressing portion is gradually lowered, and a pressure is applied to the honeycomb structure element in the axial direction from the upper surface (the other end face) of the honeycomb structure element. As the pressure is applied by the pressing portion, the honeycomb structure element and the holding portion move relative to the support portion, the volume of the filling material feeding chamber is reduced, so that the filling material fed to the filling material feeding chamber is intruded from the slit on one end face side to the slit on the other end face side. According to such a filling material filling method, the filling material can be accurately filled in the slit of the honeycomb structure to a desired depth. Further, the filling material can be filled in a short period of time as compared with the method for manually filling the slit by means of a spatula or the like, and the filling material can be filled in a plurality of slits at the same time. Therefore, the honeycomb structure can be efficiently produced. Conventionally, for example, when producing the honeycomb structure in which the filling material is filled in the slit as shown in FIG. 1, honeycomb segments each divided into a half-moon shape are prepared, and the filling material is applied to the divided honeycomb segments to join them. In this case, since there is a concern that the shape of the joined honeycomb structure may be deteriorated (e.g., the desired cylindrical shape cannot be obtained), an outer peripheral grinding step for adjusting the outer peripheral shape after joining is required. However, according to the filling material filling method according to the embodiment of the present invention described above, the accurate positioning of the honeycomb segments can suppress deterioration of the shape of the honeycomb structure after joining, and accordingly, the honeycomb structure having the slit filled with the filling material can be produced without performing the outer peripheral grinding step.

The intruding depth of the filler in the slit can be controlled by adjusting an amount of the filling material to be fed. The amount of the filling material to be fed is appropriately adjusted to an amount required for a desired intruding depth depending on the volume of the slit of the honeycomb structure element. The amount of the filling material to be fed is generally equivalent to the volume of the filling material in the slit up to the desired intruding depth. However, since all the filling material fed to the filling material feeding chamber is not necessarily intruded into the slit, the amount of the filling material to be fed should be appropriately adjusted, for example, by increasing the amount of the filling material, while taking an amount of the filling material remaining in the filling material feeding chamber into consideration. The amount of the filling material to be fed may preferably be from 4 to 40 $cm^3$. The amount of the filling material to be fed is appropriately adjusted in such a range of the amount of the filling material to be fed, while taking the volume of the slit of the honeycomb structure element and the like into consideration.

The intruding depth of the filling material into the slit may be controlled by adjusting the pressure applied by the pressing portion. As for the pressure applied by the pressing portion, the pressure required for the desired intruding depth is appropriately adjusted depending on the volume of the slit of the honeycomb structure element. The pressure applied by the pressing portion to intrude the filling material into the slit of the honeycomb structure element may preferably be from 50 to 2000 MPa, and more preferably from 500 to 1000 MPa. It is preferable that the pressure is appropriately adjusted in such a range while taking the width and length of the slit of the honeycomb structure element into consideration.

It is preferable that the filling material is intruded into the slit of the honeycomb structure element at room temperature and in a high humidity atmosphere. By intruding the filling material in such an atmosphere, the drying of the filling material can be suppressed to facilitate the intrusion into the slit. The high humidity environment may preferably be an atmosphere having a humidity of 30% RH or higher, and more preferably an atmosphere having a humidity of 80% RH or higher.

The pressing rate of the pressing portion is preferably small from the viewpoint of pressing the honeycomb structure element so as not to be broken, and is preferably large from the viewpoint of a production efficiency. From such viewpoints, the pressing rate of the pressing portion may preferably be from 0.1 to 50 cm/sec, and more preferably from 1 to 10 cm/sec.

In order to provide a uniform depth of the filling material to be intruded in the plurality of slits of the honeycomb structure element, it is preferable to uniformly press the end face of the honeycomb structure element by the pressing portion. According to such a configuration, air uniformly escapes from the plurality of slits of the honeycomb structure element, so that the depth of the filling material to be intruded can be made uniform in the plurality of slits.

According to the embodiment of the present invention, the pressure is applied in the axial direction of the honeycomb structure element and the filling material is fed from one end face, thereby intruding the filling material from the slit on one end face side to the slit on the other end face side. According to such a configuration, since the filling depth of the filling material in the slit is controlled by the pressure applied to the end face of the honeycomb structure element, the filling of the filling material to the desired depth can be controlled as compared with the manual operation of the operator. In particular, even when it is difficult to control the filling of the filling material to the desired depth, such as when the slit depth is deeper or the viscosity of the filling material is higher, in the prior art, the embodiment according to the present invention can control the filling of the filling material to the desired depth.

The honeycomb structure body into which the filling material has been intruded is heated to produce a honeycomb structure including the slit filled with the filling material. The heating may preferably be carried out at 400 to 700° C. for 10 to 60 minutes. The heating (heat treatment) is carried out in order to strengthen a chemical bonding of the filling material. The heating method is not limited, and the firing may be carried out using an electric furnace, gas furnace, or the like.

The method for producing the honeycomb structure with electrode portions is carried out by, first, applying the electrode portion forming raw material containing ceramic raw materials to the side surface of the honeycomb dried body and drying it to form a pair of unfired electrode portions on the outer surface of the outer peripheral wall, across the central axis of the honeycomb dried body, so as to extend in the form of strip in the extending direction of the cells, thereby producing a honeycomb dried body with unfired electrode portions. The honeycomb dried body with unfired electrode portions is then fired to produce a honeycomb fired body having a pair of electrode portions. The honeycomb structure with the electrode portions is thus obtained. In addition, the electrode portions may be formed after the honeycomb fired body is produced. Specifically, once the honeycomb fired body is produced, a pair of unfired electrode portions may be formed on the honeycomb fired body, and fired to produce the honeycomb fired body with the pair of electrode portions. The filling step of the filling material described above can be carried out on the honeycomb structure having electrode portions.

The electrode portion forming raw material can be formed by appropriately adding and kneading various additives to raw material powder (metal powder, and/or ceramic powder, and the like) formulated according to required characteristics of the electrode portions. When each electrode portion is formed as a laminated structure, the joining strength between each metal terminal and each electrode portion tends to be improved by increasing an average particle diameter of the metal powder in the paste for the second electrode portion, as compared with an average particle diameter of the metal powder in the paste for the first electrode portion. The average particle diameter of the metal powder refers to an arithmetic average diameter on volume basis when frequency distribution of the particle diameter is measured by the laser diffraction method.

The method for preparing the electrode portion forming raw material and the method for applying the electrode portion forming raw material to the honeycomb fired body can be performed according to a known method for producing a honeycomb structure. However, in order to achieve lower electrical resistivity of the electrode portions than that of the honeycomb structure portion, it is possible to increase a metal content ratio or to decrease the particle diameter of the metal particles as compared with the honeycomb structure portion.

Before firing the honeycomb dried body with unfired electrode portions, degreasing may be carried out in order to remove the binder and the like. The firing conditions for the honeycomb dried body with unfired electrode portions are the same as those for the honeycomb structure as described above. After firing, an oxidation treatment is preferably carried out at 1200 to 1350° C. for 1 to 10 hours in order to improve durability. The methods of degreasing and firing are not particularly limited, and they can be carried out using an electric furnace, a gas furnace, or the like.

<5. Method for Producing Electrically Heating Support>

In one embodiment of the method for an electrically heating support 30 according to the present invention, a metal electrode is fixed onto each of the electrode portions on the honeycomb structure 10 and electrically connected. Examples of the fixing method includes laser welding, thermal spraying, ultrasonic welding, and the like. More particularly, a pair of metal electrodes are provided on the surfaces of the electrode portions across the central axis of the honeycomb structure portion of the honeycomb structure 10. The electrically heating support 30 according to an embodiment of the present invention is thus obtained.

(6. Exhaust Gas Purifying Device)

The electrically heating support according to the above embodiment of the present invention as described above can be used for an exhaust gas purifying device. The exhaust gas purifying device includes the electrically heating support and a metallic cylindrical member for holding the electrically heating support. In the exhaust gas purifying device, the electrically heating support can be installed in an exhaust gas flow path for allowing an exhaust gas from an engine to flow.

DESCRIPTION OF REFERENCE NUMERALS

10 honeycomb structure
11 honeycomb structure portion
12 outer peripheral wall
13a, 13b electrode portion
15, 51 one end face
16, 52 the other end face
18 cell
19 partition wall
20 honeycomb structure element
21 slit
22 filling material
30 electrically heating support
33a, 33b metal electrode
40 filling material intruding device
41 support shaft
42 support table
43 support portion 44 elastic member
45 filling material filling chamber
46 holding portion
47 arm
48 pressing portion
49 cylinder
50 filling material
53 leg portion
54 sealing member

The invention claimed is:

1. A method for producing a ceramic honeycomb structure, the ceramic honeycomb structure comprising:
an outer peripheral wall;
a partition wall disposed on an inner side of the outer peripheral wall, the partition wall defining a plurality of cells, each of the plurality of cells extending from one end face to the other end face to form a flow path,
at least one slit extending from one end face to the other end face of the ceramic honeycomb structure; and
a filling material filling each slit;
wherein the method comprises the steps of:
preparing a ceramic honeycomb structure element comprising at least one slit extending from one end face to the other end face of the ceramic honeycomb structure element;
masking one end face of the ceramic honeycomb structure element except for the slit; and
providing the ceramic honeycomb structure element comprising the at least one slit filled with the filling material by applying a pressure to an axial direction of the ceramic honeycomb structure element and feeding the filling material from the one end face to intrude the filling material from the slit on the one end face side to the slit on the other end face side.

2. The method for producing the ceramic honeycomb structure according to claim 1, wherein the ceramic honeycomb structure has a plurality of slits.

3. The ceramic honeycomb structure according to claim 2, wherein the plurality of slits are slits that intersect with one another in the cross section of the ceramic honeycomb structure and/or are divided along an extending direction in the cross section of the ceramic honeycomb structure.

4. The method for producing the ceramic honeycomb structure according to claim 1, further comprising a step of forming a pair of electrode portions on an outer surface of the outer peripheral wall so as to extend in a band shape in an extending direction of the cells across a central axis of the ceramic honeycomb structure.

5. A method for producing an electrically heating support, the method comprising a step of electrically connecting a metal electrode to each of the pair of electrode portions of the ceramic honeycomb structure produced by the method according to claim 4.

6. The method for producing the ceramic honeycomb structure according to claim 1, further comprising a step of heating the ceramic honeycomb structure element in which the slit is filled with the filling material.

7. The method for producing the ceramic honeycomb structure according to claim 1, wherein the pressure applied is adjusted to control an intruding depth of the filling material into the slit.

8. The method for producing the ceramic honeycomb structure according to claim 1, wherein an amount of the filling material to be fed is adjusted to control an intruding depth of the filling material into the slit.

9. The method for producing the ceramic honeycomb structure according to claim 1, wherein the filling material has a viscosity of from 1 to 100 Pa·s.

* * * * *